Patented Apr. 10, 1923.

1,451,052

UNITED STATES PATENT OFFICE.

HELIODOR ROSTIN, OF VALLO, NORWAY.

TREATMENT OF HYDROCARBONS.

No Drawing.   Application filed August 29, 1916.   Serial No. 117,410.

*To all whom it may concern:*

Be it known that I, HELIODOR ROSTIN, engineer, a subject of Russia, residing at Vallo, Norway, have invented certain new and useful Improvement in the Treatment of Hydrocarbons, of which the following is a specification.

The object of this invention is:—

1. To convert hydrocarbons of high boiling points into hydrocarbons of low boiling points in such a manner as to exclude as far as possible the unsaturated hydrocarbons.

2. Also to convert unsaturated hydrocarbons into other compounds.

In carrying out my invention the heavy hydrocarbons e. g. petroleum oil or its heavy distillates, are passed in the form of vapour, together with or over a compound containing hydrogen over a substance able to effect the splitting off of the hydrogen of the said compound and giving it off in a nascent state when it can most readily combine with the vapours of any unsaturated hydrocarbons produced by cracking the said heavy hydrocarbons.

When unsaturated hydrocarbons previously produced are to be converted into saturated hydrocarbons their vapors are treated in the same way as the vapours of the heavy hydrocarbons, but at temperatures sufficiently low to prevent further cracking.

The advantage of this principle is that the oil vapours are at all points in contact with the nascent hydrogen and a most perfect combination can be effected.

For example: A tube or vessel is filled with copper or other suitable metal, which if desired may be in a finely divided state, and heated to above 500° C., vapours of heavy oils together with sulphuretted hydrogen are passed over the heated copper when the vapours of oil undergo a cracking, whereby light, unsaturated hydrocarbons are formed; the sulphuretted hydrogen becomes decomposed in contact with the heated copper, whereby a sulphide of copper and nascent hydrogen are formed; the nascent hydrogen combines instantly with the unsaturated hydrocarbons formed as mentioned before.

I have found, that in working the process in this way approximately one third of the heavy oil is converted into light hydrocarbons, and that one gallon of unsaturated hydrocarbons ($C_nH_{2n}$) requires approximately 21 cu. ft. of $H_2S$ to be converted into $C_nH_{2n+2}$.

Second example: In a case when a light oil containing unsaturated hydrocarbons, or consisting of them, is to be treated, (i. e. the product resulting from the cracking of a mineral oil or heavy mineral oil distillate or residue) the metal (for instance copper) is heated to 300° C., and the vapours of the said light oil are passed over it together with $H_2S$ when the oil does not undergo a cracking but the $H_2S$ gets decomposed as in the first example and the nascent hydrogen combines with the unsaturated compounds. The proportion of $H_2S$ is again about 21 cu. ft. per gallon of the unsaturated hydrocarbons. The reaction takes place according to the formulas:

$$H_2S + Cu = CuS + 2H$$
$$C_nH_{2n} + 2H = C_nH_{2n+2}$$

The alternative method consists of passing the hydrogen compound (with hydrocarbon vapours) with a substance able to effect the splitting off of the hydrogen of the said compound.

For example: When sulphuretted hydrogen is mixed with antimoniuretted hydrogen a sulphide of antimony is formed and nascent hydrogen given off.

The production of sulphuretted hydrogen can be carried out in accordance with the processes already known for this purpose, or can be produced, in admixture with hydrocarbon vapors, by cracking oils containing sulfur or sulfur compounds. Hydrogen sulfid can also be produced economically, by passing a mixture of gases containing hydrogen and hydrocarbons, at a temperature considerably above 500° C., over a metal sulfid. The copper sulfid produced in the execution of the process of the present application may be employed for this purpose.

The reaction is to be preferably effected when the hydrocarbons and the hydrogen compound are in gaseous form, but the reaction can also proceed when one or two of the bodies concerned are liquid. For instance: if the mixture of hydrocarbons is in liquid form and in a vessel containing some metal, say copper, supposing that the hydrocarbon mixture has a boiling point higher than the temperature required for the splitting off of hydrogen (say from $H_2S$ over copper.): in such a case the nascent hydrogen will act on the liquid hydrocarbons.

On the other hand: viz: When hydrocarbons with hydrogen sulfid dissolved or emulsified therein, are passed over a metal like sodium, the reaction will take place exactly in accordance with the main idea of this invention, but naturally the effect will be greater or smaller and it will largely depend on the characteristics of the hydrocarbon used in which particular form the principle of this invention will be applied.

Claims.

1. The method of hydrogenating unsaturated hydrocarbons, which comprises vaporizing the hydrocarbons and reacting upon said vapors with hydrogen sulphide in the presence of a metal capable of combining with the sulphide at a temperature of approximately 300° C., whereby nascent hydrogen will be liberated and combine with the hydrocarbons.

2. The method of hydrogenating unsaturated hydrocarbons, which comprises vaporizing the hydrocarbons and reacting upon said vapors with hydrogen sulphide in the presence of copper at a temperature of approximately 300° C., whereby the copper will combine with the sulphide and liberate nascent hydrogen which will combine with the hydrocarbons.

In testimony whereof I affix my signature in presence of two witnesses.

HELIODOR ROSTIN.

Witnesses:
T. P. GALLING,
OYVOR HANSSON.